Patented Feb. 14, 1933

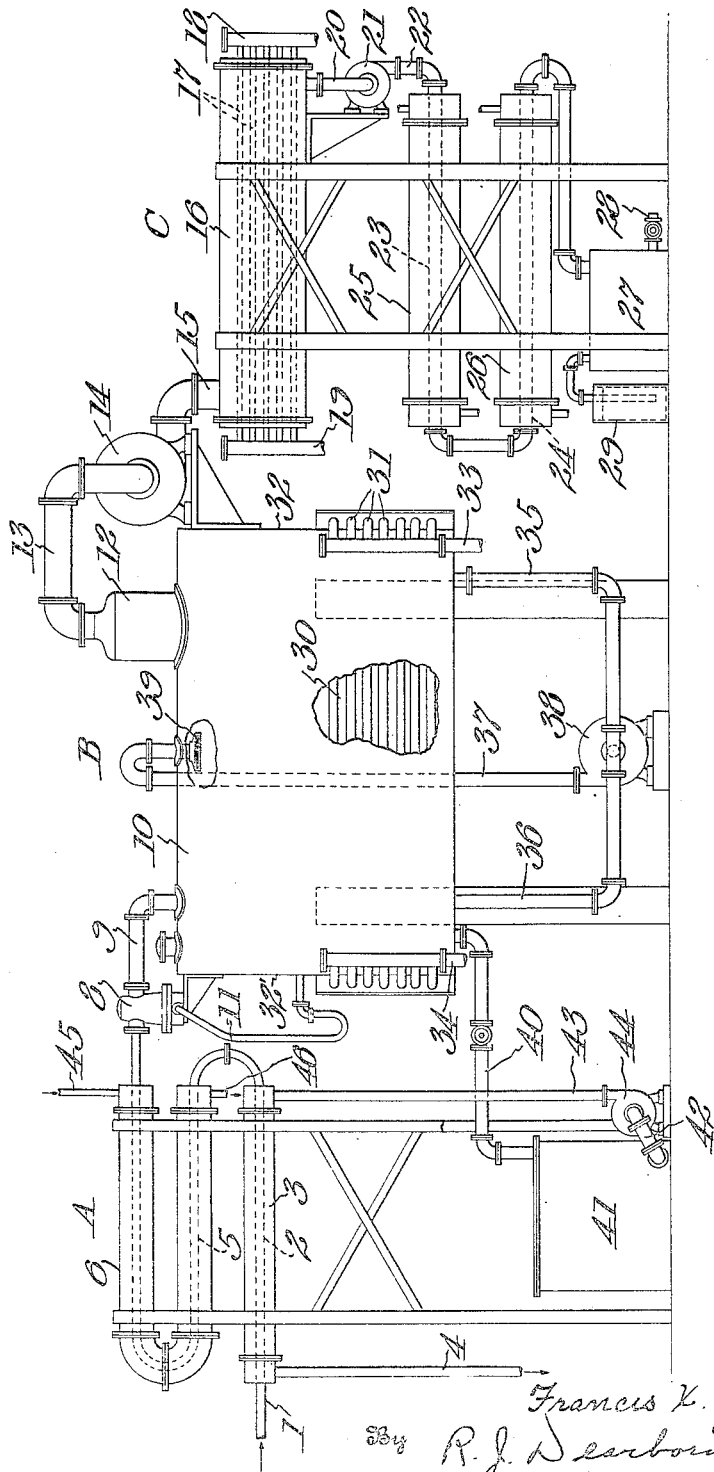

1,897,979

UNITED STATES PATENT OFFICE

FRANCIS X. GOVERS, OF VINCENNES, INDIANA, ASSIGNOR TO INDIAN REFINING COMPANY, OF LAWRENCEVILLE, ILLINOIS, A CORPORATION OF MAINE

RECOVERY OF SOLVENTS FROM MIXTURES CONTAINING THE SAME

Application filed May 7, 1931. Serial No. 535,593.

The present invention relates to a process for the recovery of organic solvents from higher boiling liquids associated therewith.

The invention contemplates an improved process for recovering solvents from mixtures of such solvents with hydrocarbon oils and is particularly well adapted to the recovering of the solvents employed in the process of dewaxing wax-containing fractions of mineral oils described in my application Serial No. 313,346, filed October 18, 1928.

In the process of dewaxing oils of my prior application above referred to, the solvents used are organic compounds of types which are more expensive than the raw materials under treatment and must, in order to permit their economical use, be practically completely recovered. Also the solvents must be removed completely from the lubricating oil product in order to preserve the characteristics giving the lubricating oil its full value as such.

This requirement of complete recovery of the solvent for purposes of economy of operation and purity of product pertains to many processes other than the dewaxing of mineral oils.

For complete solvent recovery leaks due to the apparatus or method employed in the vaporization of the solvents must be practically completely eliminated and the condensation of the vaporized solvents must take place under such conditions as to accomplish a complete recovery.

I have found that even in laboratory operations the loss of volatile solvents in ordinary methods for their recovery is unavoidable to such an extent that commercial practice is apparently prohibited.

This loss appears to be due in part to the presence of air in the apparatus at the beginning of the vaporizing operation and in part to leaks due to plus pressure maintained in the apparatus.

I have discovered that losses due to air entrainment may be overcome by maintaining a back pressure on the condenser; so much so that in the use of an apparently perfectly tight flask and an ordinary glass tube water-jacketed condenser, the loss of solvent may be reduced from say 5% to 0.5% by the use of a water seal at the end of the condenser giving a back pressure of two inches of water.

In commercial practice on plant scale operation it is most difficult, if not impossible, to prevent out-board leaks in the still, and connecting parts thereof, but I have discovered that if a plus pressure is maintained on the condenser while a minus pressure is maintained on the still, losses due to any cause may be practically eliminated.

The invention will now be described and illustrated by reference to the recovery of mixtures of acetone and benzol used in the dewaxing of lubricating fractions of mineral oils according to my aplicaiton, Serial No. 313,346, above referred to, and by reference to the accompanying drawing which is a vertical elevation, to a certain extent diagrammatic, of a plant for carrying out the solvent recovery process.

Referring to the drawing A is the preheater for the solvent-oil mixture, B is the still, and C is the condenser and cooler. The solvent-oil mixture enters the preheater A at 1 and passes through the pipe 2 surrounded by the jacket 3 through which hot oil is passed in counter-current flow and is discharged at 4. Thus the solvent-oil mixture to be treated is heated by heat transfer with the oil product of the process. As will be apparent, the heat exchange device is illustrated only conventionally and in practice may be embodied in any suitable device capable of serving this purpose. The solvent-oil mixture after passing through the pipe 2 continues through the pipe 5 having the steam jacket 6, and is thereby heated, in a flowing stream, to a temperature substantially above the boiling point of the least volatile solvent in the mixture. A suitable temperature in the case of an acetone-benzol-lubricating oil mixture has been found to be about 180° F. The solvent-oil mixture is then discharged from the preheater A into the vapor separator 8 of any suitable type comprising a space of enlarged cross sectional area with respect to the pipe 5 where the vaporized and unvaporized portions of the mixture are roughly separated, the vaporized portions passing by way of the pipe 9 into the vapor space of the still 10, while the unvaporized portion passes by way of pipe 11 into the still 10 at any suitable point. The vapor collecting in the vapor space of the still 10, is drawn through the dome 12 and pipe 13 by exhauster 14 which forces it through pipe 15 into the shell of condenser 16 which is provided with pipes 17, cooled by water introduced through pipe 18 and withdrawn through pipe 19. The condensed vapors flow through pipe 20 to the liquid pump 21 which forces them through pipe 22 to coolers 23 and 24. Coolers 23 and 24 are provided with separate jackets 25 and 26 respectively through which water is forced counter-current to the flow of the condensed vapors. For hot weather operation, jacket 25 may be supplied with spray pond water while jacket 26 is supplied with well water. The condensate falls into the receiver 27 from which it is withdrawn through pipe 28. A back pressure is maintained on the receiver 27 by a water or other suitable seal 29.

Still 10 is provided with heating means 30 consisting of a series of pipes 31 welded into and extending beyond tube sheets 32 and 32'. The pipes 31 are provided with inlet steam header 33 and outlet header 34. The still 10 is also provided with circulating means comprising pipes 35 and 36, pump 38 and pipe 37 terminating and connected with the outlet vaporizing head 39. Still 10 is further provided with a valved discharge pipe 40 which drains into tank 41. Tank 41 is connected with the jacket 3 by means of the pipes 42 and 43 and pump 44.

In carrying out the process in the apparatus above described solvent-oil mixture is supplied through the preheater A by means of a force pump (not shown) to the still B and vapors are mechanically withdrawn from the still B and delivered to the condenser C by means of the exhauster 14 until the amount of unvaporized liquid in the still 10 reaches a level slightly above the pipes 31. At this point steam is introduced by means of header 33 to pipes 31 and the pump 38 is started. This causes a circulation of oil with the small amount of solvent retained in its down pipes 35 and 36 through the pump 38 and up pipe 37 to the spreader header 39 by which it is distributed over the inner walls of the shell 10. The vapor is withdrawn by the exhauster 14 and forced to the condenser C and the unvaporized portion flows down the sides of the still into the reservoir of liquid contained therein.

The exhauster 14 serves to maintain a subatmospheric pressure within the still, as for example, two or three inches of water less than atmospheric, while exerting a plus pressure of about five pounds per square inch gauge upon the vapors within the condenser C. The completely condensed vapors are then forced by the pump 21 at a high velocity and under a pressure of about 25 pounds per square inch gauge through the succeeding coolers 23 and 24.

After the liquid in the still has reached a level advantageously well above the pipes 31, the flow through the preheater A is stopped and the circulation is continued while heat is applied to pipes 31 until the oil is freed from the remaining solvent. In the example, the oil reaches a temperature of approximately 340° F. at the finish. The oil is then quickly withdrawn from the still into the receiver 41, the flow of oil-solvent mixture is started through the preheater A and the oil in tank 41 is passed through the shell 3 and out by way of the pipe 4, interchanging its heat in counter-current flow with the oil-solvent mixture entering pipe 1, the remainder of the heat necessary to heat the oil-solvent mixture to 180° F. being supplied by steam introduced by pipe 45 and withdrawn by 46.

For the purpose of illustration the invention has been described in connection with the recovery of acetone and benzol from hydrocarbon oil mixtures with such solvents but it is to be understood, however, that the invention is not limited to the recovery of a particular solvent, or solvent mixture, from a particular high boiling liquid.

Obviously many modifications and variations of the invention, as hereinbefore set forth, may be made without departing from the spirit and scope thereof, and therefore only such limitations should be imposed as are indicated in the appended claims.

I claim:

1. The process of recovering acetone and benzol from a mixture of acetone and benzol with mineral lubricating oil which comprises heating the mixture in a flowing stream to a temperature of about 180° F., flashing off acetone and benzol vapors from the heated mixture, introducing the unvaporized liquid comprising lubricating oil and a small proportion of unvaporized acetone and benzol to a still maintained under slightly less than atmospheric pressure, further heating this liquid to a temperature of about 340° F. by rapid circulation over and spraying upon heating surfaces within the still to thereby strip out in vapor form the remaining acetone and benzol, delivering the acetone and benzol vapors evolved during flashing and stripping to a condenser under a pressure slightly greater than maintained in the still to effect substantially complete condensation, and then subjecting the resulting hot substantially vapor-free condensate to cooling under still higher pressure during countercurrent flow at high velocity in heat exchange relationship with a cooling liquid.

2. The process of recovering acetone and benzol from a mixture of acetone and benzol with mineral lubricating oil which comprises preheating the mixture by flowing in heat exchange relationship with hot oil from which the acetone and benzol have been recovered, further heating the mixture if necessary to a temperature of about 180° F. to flash off the bulk of the acetone and benzol, introducing the unvaporized liquid comprising lubricating oil and a small proportion of unvaporized acetone and benzol to a still maintained under a pressure slightly less than atmospheric pressure, further heating this liquid to a temperature of about 340° F. by rapid circulation over and spraying upon heating surfaces within the still to thereby strip out in vapor form the remaining acetone and benzol, delivering the acetone and benzol vapors evolved during flashing and stripping to a condenser under a pressure slightly above atmospheric pressure to effect substantially complete condensation, then subjecting the resulting hot substantially vapor-free condensate to cooling under still higher pressure during countercurrent flow at high velocity in heat exchange relationship with a cooling liquid, and withdrawing the stripped oil from the still for use in preheating fresh charge.

In witness whereof I have hereunto set my hand this 29th day of April, 1931.

FRANCIS X. GOVERS.